United States Patent [19]

Rolinski et al.

[11] 4,431,697

[45] Feb. 14, 1984

[54] LASER HARDENED MISSILE CASING STRUCTURE

[75] Inventors: Edmund J. Rolinski; Duane M. Patterson, both of Dayton, Ohio

[73] Assignee: The United States of America as represented by the Secretary of the Air Force, Washington, D.C.

[21] Appl. No.: 404,064

[22] Filed: Aug. 2, 1982

[51] Int. Cl.³ .................................................. B32B 5/16
[52] U.S. Cl. ............................... 428/242; 244/117 A; 244/158 A; 428/245; 428/408; 428/455; 428/920; 428/457; 428/463
[58] Field of Search ............... 428/242, 457, 455, 463, 428/408, 245, 920; 244/121, 117 A, 158

[56] References Cited

U.S. PATENT DOCUMENTS

| 3,603,260 | 9/1971 | Johnson | 244/117 A |
| 3,712,566 | 1/1973 | Branen et al. | 244/117 A |
| 3,914,392 | 10/1975 | Klett | 428/408 |
| 3,986,690 | 10/1976 | Milling | 244/121 |
| 4,008,348 | 2/1977 | Slemp | 428/35 |
| 4,041,872 | 8/1977 | McCown et al. | 102/105 |
| 4,268,562 | 5/1981 | Bacon et al. | 244/121 |
| 4,323,012 | 4/1982 | Driver | 244/121 |

Primary Examiner—George F. Lesmes
Assistant Examiner—E. Rollins Buffalow
Attorney, Agent, or Firm—Donald J. Singer; Bobby D. Scearce

[57] ABSTRACT

A laser hardened casing structure for a missile or the like is described herein which comprises, in a preferred embodiment, a pair of thermally protective layers with a laser hardened barrier layer sandwiched therebetween and comprising a heavy metal bearing resin impregnated carbon fabric, all of said layers being adhesively joined and secured to the outer surface of the casing structure to be protected.

3 Claims, 2 Drawing Figures

LASER HARDENED MISSILE CASING STRUCTURE

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of protective outer surface structures or casings for spacecraft, aircraft, missiles, or the like, configured for resistance to radiation damage, and more specifically, to an improved missile casing structure or the like which is hardened against damage by laser radiation.

Modern developments in laser technology and the concomitant application thereof to weapon systems has necessitated intense development of protective countermeasures to render missile and other weapon systems substantially invulnerable to laser attack. By necessity, the structure defining the outer shell or casing for missiles, aircraft, spacecraft or the like which contain and protect the critical components of the airborne systems, including the propulsion and guidance systems, the fuel, and payload, must therefore, be configured for hardening against the effects of high intensity laser irradiation. Preferably, the laser hardened protective structure for a missile will not substantially compromise total system cost or weight considerations.

Prior art structures configured to provide resistance to the effects of laser or other potentially damaging radiation have included various highly reflective surfaces and heat resistant coatings or paints, and metal, ceramic or resin composites, representative of which may be that disclosed by or referenced in: U.S. Pat. No. 4,008,348 to Slemp describing a laminated coating comprising a particulate radiation stable coating over a transparent solar radiation film having a mirror reflecting metal deposited on the bottom thereof; U.S. Pat. No. 4,041,872 to McCown et al describing a layered shield for a housing comprising a tin sheet overlaid with a glass filament reinforced resin matrix composite and sprayed with an external ablative insulation; U.S. Pat. No. 3,712,566 to Branen et al describing a thermal protective coating of silica cloth impregnated with a phenolic resin; U.S. Pat. No. 4,268,562 to Bacon et al describing an alumina fiber reinforced ceramic composite having two series of alumina fibers oppositely oriented in the composite; and U.S. Pat. No. 3,986,690 to Milling describing a retroreflective aluminum structural surface positioned beneath the outer skin of an aircraft.

Existing laser resistant surface configurations, however, do not adequately provide the necessary hardening to laser penetration of the casing structure for critical components of a missile or the like.

The present invention, however, provides a laser hardened case structure for a missile or the like substantially reducing the vulnerability of the missile to laser attack without substantial cost or weight penalty to the missile system.

It is, therefore, an object of the present invention to provide a laser hardened, protective casing structure for a ballistic missile or the like.

It is a further object of the present invention to provide a lightweight, low cost protective casing for a missile or the like which is resistant to laser attack.

These and other objects of the present invention, as would occur to one with skill in the applicable fields, will become apparent as the detailed description of certain representative embodiments thereof proceeds.

SUMMARY OF THE INVENTION

In accordance with the foregoing principles and objects of the present invention, a laser hardened casing structure for a missile or the like is described herein which comprises, in a preferred embodiment, a pair of thermally protective layers with a laser hardened barrier layer sandwiched therebetween and comprising a heavy metal bearing resin impregnated carbon fabric, all of said layers being adhesively joined and secured to the outer surface of the casing structure to be protected.

DESCRIPTION OF THE DRAWINGS

The present invention will be more clearly understood and appreciated from a reading of the following detailed description of specific representative embodiments thereof in conjunction with the accompanying drawings wherein.

DETAILED DESCRIPTION

Figure 1:
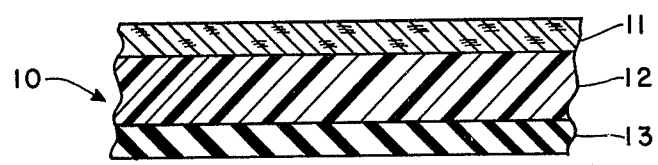
FIG. 1 is a sectional view of a conventional fiberglass casing structure for a fuel tank having a thermally protective outer layer.

Referring now to the drawings, FIG. 1 shows in cross section the layered structure of an existing missile casing, generally designated as casing structure 10. The conventional structure of casing 10 of FIG. 1 may comprise an outer layer 11 typically of a cork composition such as cork phenolic, cork epoxy, or cork nitrile. Outer layer 11 functions generally as a thermal protective layer for the remainder of the casing structure, and may comprise in alternate configurations carbon phenolic, silica phenolic, carbon nitrile, or epoxy novalac coatings, ranging in thickness from about 0.1 cm to about 1.0 cm.

Outer layer 11 is adhesively bonded to fiberglass composite missile structural member 12 using conventional bonding agents. Structural member 12 of the conventional structure shown in FIG. 1 comprises fiberglass, although other materials such as Kevlar® fibers, graphite fibers, or the like, may be applicable, depending on the system encased, to provide the desired structural strength to casing 10. FIG. 1 also shows the location of a fuel sealant liner 13, representative of the use of a casing 10 for the protection of a fuel containment system.

Figure 2:
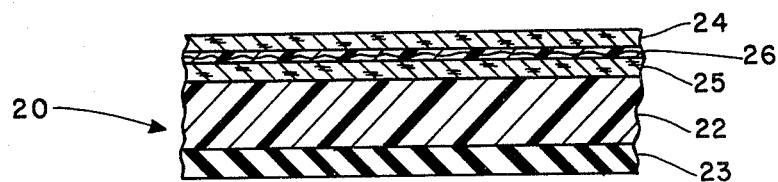
FIG. 2 is a sectional view of a fiberglass casing having an outer protective layered structure incorporating the novel laser hardened barrier layer of the present invention.

FIG. 2 illustrates a representative embodiment of the novel laser-hardened protective structure of the present invention as applied to the protection of the casing 20 for such as a fuel containment system. As shown in FIG. 2, the missile casing may comprise a fiberglass structural member 22 for enclosing the fuel containment system including a fuel sealant liner 23. The novel laser hardened protective covering hereinafter described may be applied to various casing materials and configurations which, it should therefore be noted, are not limiting of the invention herein.

The novel laser hardened protective structure of the present invention may comprise, as shown in the representative embodiment of FIG. 2, a pair of thermal protection layers 24 and 25 of cork composition, cork phenolic, cork epoxy, cork nitrile, or other mentioned conventionally used thermal protection material, or like materials which may exhibit ablative character upon exposure to high temperature. Layers 24 and 25 may each be from about 0.1 cm to about 1.0 cm in thickness, and preferably from about 0.05 cm to about 0.5 cm.

Sandwiched between layers 24 and 25 is unconventional laser hardening barrier 26. Barrier 26 may generally comprise a heavy metal bearing resin impregnated carbon fabric. The heavy metal may be in the form of powder or granules, and is preferably in the form of a resin dispersion. The heavy metal, preferably tungsten, may be carried by a resin such as epoxy, acrylic, ester, or amide, the resin-heavy metal mixture being impregnated into woven fabrics of carbon pitch fibers or carbon thread, or directly in the form of treated carbon filaments. Fully satisfactory casing structures 20 were fabricated including as the laser barrier 26 a single ply thickness of tungsten bearing resin impregnated carbon cloth which is graphitized at about 2800° C. in an inert gas environment, available commercially from Hitco Corporation, of Gardena, Calif., as Hitco TBR/SWB-8 (2800° C.). The thickness of layer 26 may be from about 0.02 cm to about 0.1 cm. Further, a plurality of individual layers 26 may be desirable.

Layers 24, 25 and 26 may be bonded together using any suitable temperature resistant adhesive, such as epoxy, acrylic or amide.

Test specimens (cut to $2.5 \times 2.5$ cm) of the layered casing structure 20 were prepared for destructive testing and comprised a painted external cork layer 24, the Hitco TBR material as layer 26, and a second cork layer 25. The layers 24, 26, and 25 were bonded together and to a fiberglass structural member 22 using Devcon five-minute epoxy adhesive. Thermocouples (chromel-alumel, type K) were imbedded between the cork layer 25 and the fiberglass structural member 22. The thermocouples provided temperature-time histories for the test specimens during laser irradiation tests described below. During fabrication, the thermocouple leads were laid in the bond line between cork layer 25 and fiberglass structural member 22 to minimize the effects on the tests of heat conduction along the thermocouple lead wires. The layers of the test specimens were clamped together at moderate pressure to minimize distortion of the cork composition layers during adhesive cure.

The specimens were distructively tested to determine the effects of laser irradiation on the structure in the simulated environment of a wind tunnel. The laser system used for the tests was an electric discharge convective continuous wave carbon dioxide laser having the following operating characteristics:

Wavelength: 10.6 microns
Power output: 11 kilowatts
Beam divergence: 3.7 milliradians The laser beam was circular in cross section and had a substantially uniform intensity profile with a maximum deviation in local power intensity of less than about $\pm 12\%$ from the mean average power intensity of the entire beam. Energy measurements on the laser were made using an absorptive calorimeter. Statistically, measurements of laser energy had an uncertainty of about $\pm 11.68\%$. The incident beam energy was directed at an angle of about 10° from the normal to the exposed specimen surface in a direction downstream in the wind tunnel flow.

The wind tunnel used was a blowdown type using a $5 \times 10$ cm discharge nozzle. The wind tunnel test configuration comprised channel flow with nitrogen gas flowing tangentially across the irradiated specimen face at about Mach 0.1. The specimen was positioned at 5.5 cm downstream of the wind tunnel nozzle outlet. Under these flow conditions, the dynamic gas shear stress at the specimen surface was calculated to be approximately 290 dynes/m$^2$. The mass transfer coefficient was calculated to be approximately 0.098 Kg/m$^2$sec.

A plurality of such test specimens as described above were destructively tested by laser irradiation using the carbon dioxide laser at a power level of up to about 5000 watts/cm$^2$. In all cases, the specimens were irradiated sufficiently for the outer cork composition layer 24 to be substantially fully ablated. Delamination of the cork and TBR layers occurred in one specimen. However, in all cases, no indication of ablation of the laser barrier layer was evident.

The present invention, as herein described, therefore provides a novel laser hardened structure for protection of surfaces of missiles or the like. The layered configuration of this invention permits erosion and ablation of the outer thermal protection layer during substantial temperature excursions, such as might occur during launch, laser or other radiation exposure, aerodynamic heating, etc., without compromising the laser hardening character of the barrier.

It is understood that certain structural modifications and material substitutions may be made as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

We claim:

1. A thermally protective covering for the laser hardened casing structure of a missile, aircraft, or the like, which comprises:
   a. a first ablative layer adapted to be applied to said casing structure;
   b. a thermal barrier layer applied to said first ablative layer, said barrier layer comprising a carbon fabric impregnated with a heavy metal powder bearing resin; and
   c. a second ablative layer applied to said thermal barrier layer wherein said ablative layers comprise a cork-resin composition.

2. The thermally protective covering as recited in claim 1 wherein said heavy metal is tungsten.

3. A laser hardened casing structure, comprising:
   a. a casing;
   b. a pair of thermally protective layers; wherein said protective layers comprise a cork-resin composition and
   c. a laser hardened barrier layer comprising a carbon fabric impregnated with a heavy metal powder bearing resin sandwiched between said protective layers, all of said layers being adhesively joined and secured to an outer surface of said casing.

* * * * *